(12) United States Patent
Lyle

(10) Patent No.: US 11,341,854 B1
(45) Date of Patent: May 24, 2022

(54) AUTONOMOUS VEHICLE FLEET MANAGEMENT SYSTEM

(71) Applicant: UIPCO, LLC, San Antonio, TX (US)

(72) Inventor: Ruthie D. Lyle, Durham, NC (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 258 days.

(21) Appl. No.: 16/288,701

(22) Filed: Feb. 28, 2019

Related U.S. Application Data

(60) Provisional application No. 62/724,806, filed on Aug. 30, 2018.

(51) Int. Cl.
  *G08G 1/00* (2006.01)
  *G05D 1/00* (2006.01)
  *G06Q 10/02* (2012.01)

(52) U.S. Cl.
  CPC .......... *G08G 1/202* (2013.01); *G05D 1/0027* (2013.01); *G05D 1/0088* (2013.01); *G06Q 10/02* (2013.01); *G05D 2201/0213* (2013.01)

(58) Field of Classification Search
  CPC .... G08G 1/202; G05D 1/0027; G05D 1/0088; G05D 2201/0213; G06Q 10/02
  See application file for complete search history.

(56) References Cited

U.S. PATENT DOCUMENTS

| | | | | |
|---|---|---|---|---|
| 6,839,744 B1* | 1/2005 | Kloba | ..................... | H04L 29/06 709/219 |
| 2012/0269396 A1* | 10/2012 | Boncyk | ............... | G06F 16/5866 382/103 |
| 2015/0032620 A1* | 1/2015 | Castinado | .............. | G06Q 20/40 705/44 |
| 2016/0078417 A1* | 3/2016 | DeLuca | .................. | G01S 19/13 701/23 |
| 2016/0355336 A1* | 12/2016 | Huber | ....................... | B65F 3/00 |
| 2016/0363938 A1* | 12/2016 | Frolov | .................. | B64C 39/024 |
| 2017/0277191 A1* | 9/2017 | Fairfield | ............... | H04W 4/029 |
| 2017/0371349 A1* | 12/2017 | Kim | ..................... | G05D 1/0274 |
| 2018/0308191 A1 | 10/2018 | Matthiesen et al. | | |
| 2018/0315146 A1* | 11/2018 | Matthiesen | ...... | G06Q 10/06315 |
| 2019/0034920 A1 | 1/2019 | Nolan et al. | | |
| 2019/0285426 A1* | 9/2019 | Mitchell | .............. | G06Q 10/047 |
| 2019/0358818 A1* | 11/2019 | Kanitz | ..................... | B60S 1/64 |
| 2020/0005295 A1 | 1/2020 | Murphy | | |
| 2020/0074411 A1* | 3/2020 | Hughes | ................. | G07C 5/006 |
| 2020/0159251 A1 | 5/2020 | Iwasaki et al. | | |

OTHER PUBLICATIONS

Office Action dated Jan. 7, 2021 in U.S. Appl. No. 16/288,750.

* cited by examiner

*Primary Examiner* — Tyler J Lee
*Assistant Examiner* — Yufeng Zhang
(74) *Attorney, Agent, or Firm* — Plumsea Law Group, LLC

(57) ABSTRACT

A vehicle dispatch system including a device processor and a non-transitory computer readable medium including instructions executable by the device processor to perform the following steps: receiving a user request for one or more services; dispatching, to a location designated by the user, a vehicle configured to provide one or more services to the user.

17 Claims, 16 Drawing Sheets

AUTONOMOUS VEHICLE FLEET MANAGEMENT SYSTEM

CROSS-REFERENCE TO RELATED APPLICATION(S)

This application claims priority to Lyle, U.S. Provisional Patent Application No. 62/724,806, filed Aug. 30, 2018, and entitled "Autonomous Vehicle Fleet Management System," the entire disclosure of which is incorporated herein by reference.

TECHNICAL FIELD

The present disclosure generally relates to an autonomous vehicle fleet and, more specifically, to an autonomous vehicle fleet configured to provide services at a location designated by a user requesting service.

BACKGROUND

Various kinds of services are traditionally provided at a place of business to which a client, customer, or member must visit in order to be provided with such services. For example, financial services are provided at a bank, an ATM kiosk, or a mobile ATM vehicle provided, for example, at a location of a well-attended event, such as a concert, festival, fair, etc. Other types of services, such as document execution services, are also provided at a service provider's location. If a client wishes to complete a legal transaction, such as signing a Last Will and Testament, they may attend a lawyer's office. If a home buyer wishes to complete a real estate transaction, they visit a realtor's office. These services are provided at the convenience of the service provider.

It may be impossible, difficult, or otherwise inconvenient for a client, customer, or member to have to travel to the location of a service provider. For example, they may live in a remote location, or may work long hours such that they are unavailable during normal business hours of service providers. In addition, for those whose spouses travel, for example for business or military service, their availability to visit service providers' places of business can be significantly limited.

There is a need in the art for a system and method that addresses the shortcomings discussed above.

SUMMARY

The present disclosure is directed to a system and methods for operating an autonomous fleet of vehicles configured to provide services, such as financial services, document execution services, etc., at the location of a user. The user may submit a request for such services, and a vehicle configured to provide the services requested by the user may be dispatched to a location designated by the user. Accordingly, the services can be provided at the convenience of the user. Further, since the fleet vehicles may be autonomous, they may operate around the clock, and thus, are not limited to convention business hours.

In one aspect, the present disclosure is directed to a vehicle dispatch system. The system may include a device processor and a non-transitory computer readable medium including instructions executable by the device processor to perform the following steps: receiving a user request for one or more services; dispatching, to a location designated by the user, a vehicle configured to provide one or more services to the user.

In another aspect, the present disclosure is directed to a vehicle summoning system. The system may include a device processor; and a non-transitory computer readable medium including instructions executable by the device processor to perform the following steps: submitting a user request for one or more predetermined services; wherein submitting the user request includes designating a location to which a vehicle is to be dispatched in order to provide the requested one or more predetermined services.

In another aspect, the present disclosure is directed to an autonomous vehicle fleet management platform, comprising: a device processor; and a non-transitory computer readable medium including instructions executable by the device processor to perform the following steps: receiving a vehicle fleet dispatch protocol from a service provider; receiving one or more user requests for service from one or more users; and dispatching vehicles of an autonomous vehicle fleet in response to the one or more user requests and according to the vehicle fleet dispatch protocol.

In another aspect, the present disclosure is directed to an autonomous vehicle. The vehicle may include equipment configured to provide one or more services to a user in the presence of the vehicle. In addition, the vehicle may include a device processor; and a non-transitory computer readable medium including instructions executable by the device processor to perform the following steps: receiving and executing dispatch instructions by autonomously driving to a location designated by a user; and providing the one or more services to the user at the designated location.

In another aspect, the present disclosure is directed to a fleet of autonomous vehicles. The fleet may include a first vehicle including a first set of equipment configured to provide a first service to a user in the presence of the vehicle and a second vehicle including a second set of equipment configured to provide a second service to a user in the presence of the vehicle. Each vehicle of the fleet includes: a device processor; and a non-transitory computer readable medium including instructions executable by the device processor to perform the following steps: receiving and executing dispatch instructions by autonomously driving to a location designated by a user; and providing the one or more services to the user at the designated location.

In another aspect, the present disclosure is directed to a method of providing a service with an autonomous vehicle, comprising: the vehicle receiving an instruction for vehicle dispatch in response to a user request for service; the vehicle driving to a location designated by the user; and providing one or more services to the user at the designated location. In conjunction with providing the one or more services, providing a communication service between the user and an assistant service provider at a location remote from the vehicle via communication equipment provided on the vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
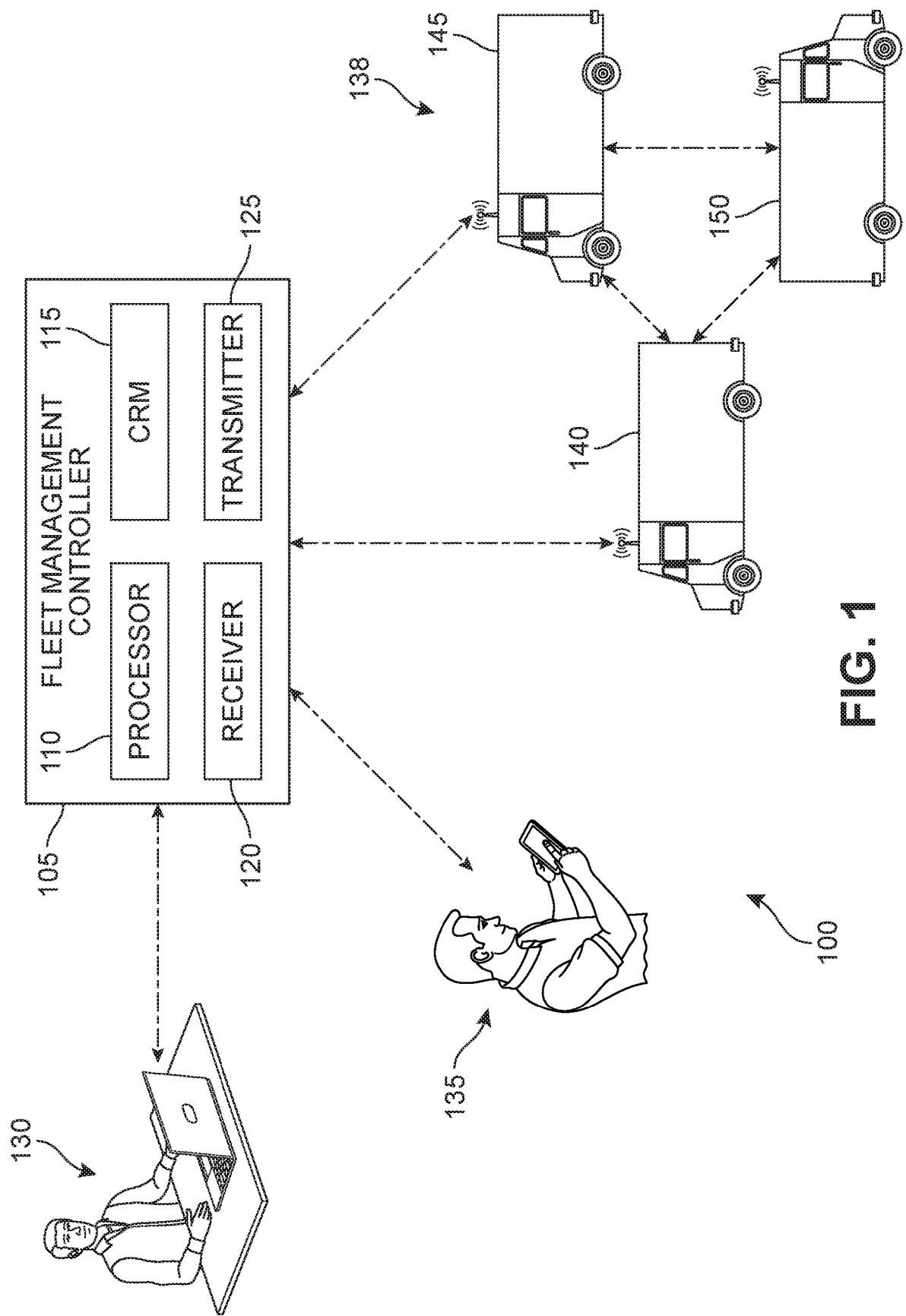
FIG. 1 is a schematic illustration of a vehicle fleet dispatch system and process.

FIG. 1 is a schematic illustration of a vehicle fleet dispatch system and process. As shown in FIG. 1, a vehicle dispatch system 100 may include a fleet management controller 105.

Controller 105 may include various computing and communications hardware. For example, as shown in FIG. 1, controller 105 may include a device processor 110 and a non-transitory computer readable medium 115 including instructions executable by device processor 110. Computer readable medium 115 may include any suitable computer readable medium, such as a memory, such as RAM, ROM, flash memory, or any other type of memory known in the art. Controller 105 may include other computing hardware, such as servers, integrated circuits, displays, etc.

Further, controller 105 may include networking hardware configured to interface with other nodes of a network, such as a LAN, WLAN, or other networks. For example, as shown in FIG. 1, controller 105 may include a receiver 120 and a transmitter 125. (It will be appreciated that, in some embodiments, the receiver and transmitter may be combined in a transceiver.) Receiver 120 and transmitter 125 may be configured to provide communication with other nodes of system 100. For example, receiver 120 and transmitter 125 may be configured to communicate with vehicles of a fleet 138. Such communication may be executed via any suitable format, such as satellite communication, radiofrequency signals, etc.

Controller 105 may be provided at any suitable location. In some cases, controller 105 may be provided at a headquarters of a service provider. In other cases, controller 105 may be provided at a dedicated dispatch facility configured to coordinate the fleet management processes.

Computer readable medium 115 of controller 105 may include instructions for receiving a user request for one or more services. For example, as shown in FIG. 1, controller 105 may be configured to receive requests from users accessing system 100 via various access tools. For example, a first user 130 is shown accessing system 100 via the Internet, e.g., with a laptop. A second user 135 is shown accessing system 100 via an application (app) on a personal electronic device, such as a telephone. These users may submit requests for services using these access tools.

Computer readable medium 115 of controller 105 may further include instructions for dispatching, to a location designated by the user, a vehicle configured to provide one or more services to the user. Further, computer readable medium 115 may include instructions to dispatch a fleet of vehicles in response to a plurality of user requests. For example, fleet 138 may include a plurality of vehicles, including a first vehicle 140, a second vehicle 145, and a third vehicle 150. In some embodiments, these vehicles may have different equipment, configured to provide different services to users. Accordingly, system 100 may be configured to dispatch different vehicles depending on what type of service is being requested by the user. Accordingly, a first vehicle may include a first set of equipment configured to provide a first service to a user in the presence of the vehicle. A second vehicle may include a second set of equipment configured to provide a second service to a user in the presence of the vehicle.

In some embodiments, the vehicles of fleet 138 may communicate with each other. In some cases, the range from which controller 105 may reach a vehicle may be extended by using a closer, or otherwise more accessible, vehicle as a relay. In other cases, vehicles may utilize artificial intelligence and/or machine learning to make adjustments to dispatch protocols and instructions. This may improve efficiency and/or response time. For example, upon receiving instructions, a first vehicle may evaluate whether it has enough fuel to complete the instructed trip. If not, the vehicle may pass along the instruction to another vehicle in the field. In some cases, the vehicles may broadcast a single signal that may be received by all vehicles in the fleet, and a suitable vehicle may accept the instructions passed along by the first vehicle. In other cases, the first vehicle may identify the vehicle that is closest to itself, the designated location of service, and/or the vehicle that otherwise best suited to make the requested trip and provide the requested service. The first vehicle may send a signal only to the identified vehicle, passing along the service instructions. Communication between vehicles of the fleet significantly broadens the capabilities of the fleet as a whole and provides a great amount of flexibility and efficiency in terms of the collective ability of the fleet to provide service to a large number of users.

Figure 2:
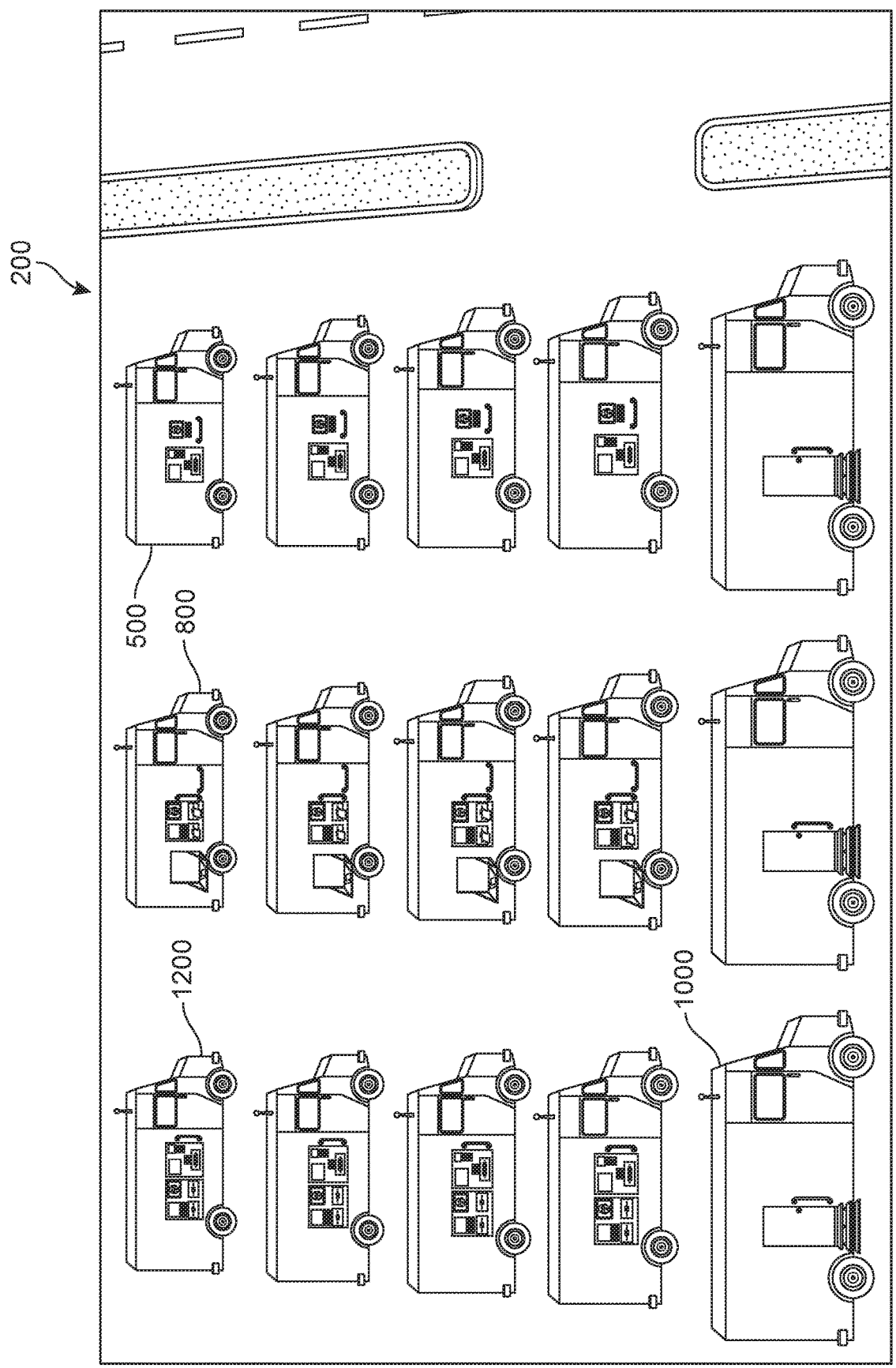
FIG. 2 is a schematic illustration of a fleet of vehicles configured for providing services.

FIG. 2 is a schematic illustration of a fleet 200 of vehicles configured for providing services. For example, FIG. 2 illustrates a plurality of banking services vehicles 500, a plurality of document execution services vehicles 800, a plurality of dual service vehicles 1200, and a plurality of mobile office vehicles 1000. Exemplary features of these and other types of service vehicles are discussed in greater detail below.

In some embodiments, one or more of these vehicles may be autonomous. That is, one or more of these vehicles may be configured to drive itself, unpiloted, to a location according to received instructions. Accordingly, in some embodiments, each vehicle of the fleet includes a device processor and a non-transitory computer readable medium including instructions executable by the device processor. For example, the computer readable medium on each vehicle may include instructions for receiving and executing dispatch instructions by autonomously driving to a location designated by a user. Further, the computer readable medium on each vehicle may include instructions for providing the one or more services to the user at the designated location.

Figure 3:
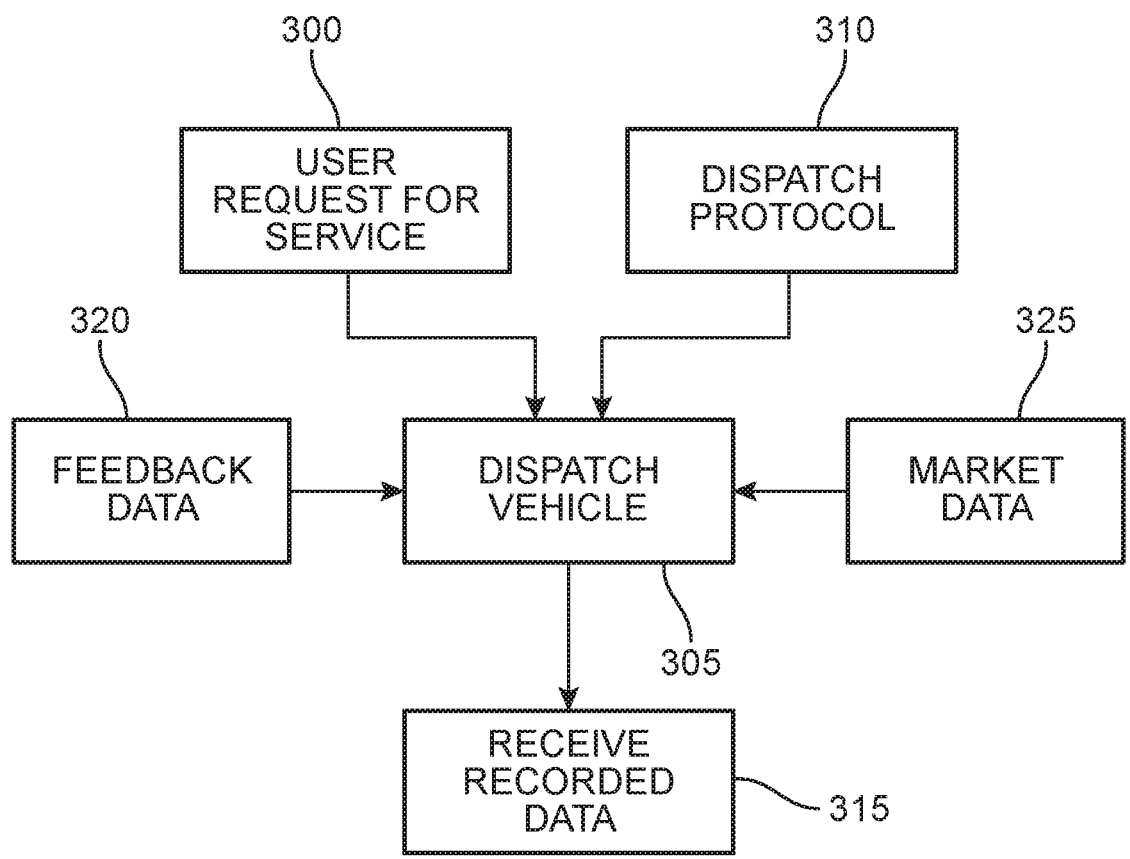
FIG. 3 is a flowchart illustrating a vehicle fleet dispatch process.

FIG. 3 is a flowchart illustrating a vehicle fleet dispatch process. As shown in FIG. 3, a user request 300 may be received, and a vehicle may be dispatched at step 305 accordingly. In addition to the user request, several other sources of information may be considered when executing the dispatch process. For example, in some embodiments, a dispatch protocol 310 may be used to determine how the vehicles of the fleet are to be dispatched in response to user requests. This dispatch protocol may be determined by a service provider.

The dispatch protocol may designate which types of vehicles are to be dispatched for given service requests. The dispatch protocol is the set of rules that are used to determine how, when, and where vehicles of the fleet are to be dispatched, based on the information available from various sources, including market data and feedback data.

As shown in FIG. 3, the computer readable medium of the system may include instructions for recording and receiving data regarding operation of the vehicle (step 315) and factoring the recorded feedback data 320 into the dispatch of fleet vehicles. Recorded feedback data 320 may include any number of pieces of information regarding the dispatch of the vehicle (e.g., trip distance, average speed, terrain of the route, and/or local rules and regulations restricting vehicular travel, etc.), the service provided (e.g., the type of service, the duration of the service visit, whether an assistant service provider is on board as a passenger, the amount of fuel/charge used for the trip, whether the service involved a cash withdrawal or deposit, etc.).

Further, the computer readable medium of the system may include instructions for considering market data, such as vehicle condition/status (e.g., fuel level/battery charge, cash balance on board the vehicle, present location of the vehicle at the time of dispatch, etc.), fleet status (e.g., the number of vehicles of the type requested that are available, the geographical distribution of the vehicles, the number of service requests pending, etc.), regional information (e.g., population in the region, the number of members of the service provider in the region, the number of members temporarily out of the area (e.g., military deployment, away at college, etc.), the demographics of the populous, etc.), and/or national information (e.g., mortgage rates, investment interest rates, lending interest rates, etc.).

The computer readable medium of the system includes instructions for using this recorded data and additional market data to determine a dispatch scheme of the fleet.

The vehicles of the fleet may include on-board equipment configured to provide services to users. For example, the vehicles may be equipped with an automated teller machine (ATM), a document execution machine, a mobile office space, or other service equipment. In some cases, the equipment may be provided on a side of the vehicle for walk-up access to the service providing equipment. For example, an ATM may be built into the side panel of a truck. This may facilitate providing service to a user in their own driveway of their house, or curbside at their house or another designated location, such as the user's place of work.

The equipment may be strategically placed for convenient access by users in likely scenarios for the given dispatch locality. For example, for jurisdictions in which traffic drives on the right side of the road, the service equipment may be provided on the right side of the truck, in order to facilitate curb-side access without having to stand in the roadway. Conversely, in jurisdictions in which traffic drives on the left side of the road, the service equipment may be provided on the left side of the truck. In other cases, it may be beneficial to provide the service equipment on the rear of the truck. For example, when providing multiple services and/or multiple different services, a truck may be configured with service equipment on both the side and rear of the truck.

Figure 4:
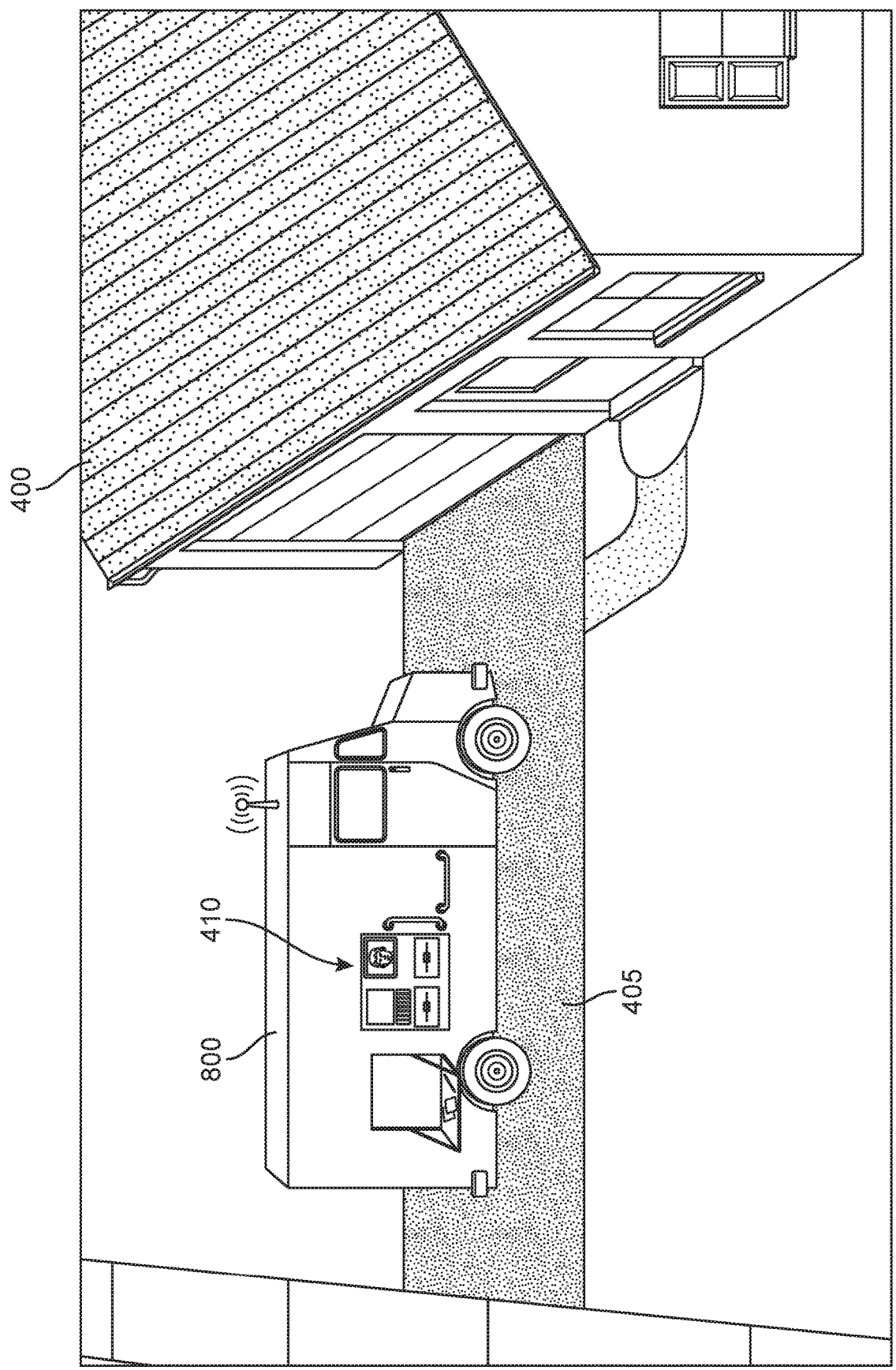
FIG. 4 is a schematic illustration of a service vehicle at a user's house.

FIG. 4 is a schematic illustration of a service vehicle at a user's house. As shown in FIG. 4, a document execution vehicle 800 (discussed in greater detail below) is parked at a user's house 400, in the driveway 405. Vehicle 800 may be equipped with service equipment 410, which provides walk-up access to document execution services.

The disclosed autonomous fleet management concepts may apply to a wide variety of services that could be provided by vehicles. The following is a discussion of some exemplary equipment and associated services that may be provided by vehicles of the disclosed fleet. These are intended to be exemplary only. Other configurations and combinations of equipment are also possible.

In some embodiments, one or more vehicles of the fleet may be configured with equipment for providing banking services and/or other financial services. In some cases, one or more vehicles may be provided with a built-in ATM. In some embodiments, the services equipment may be configured to provide additional financial services beyond basic ATM services.

Figure 5:
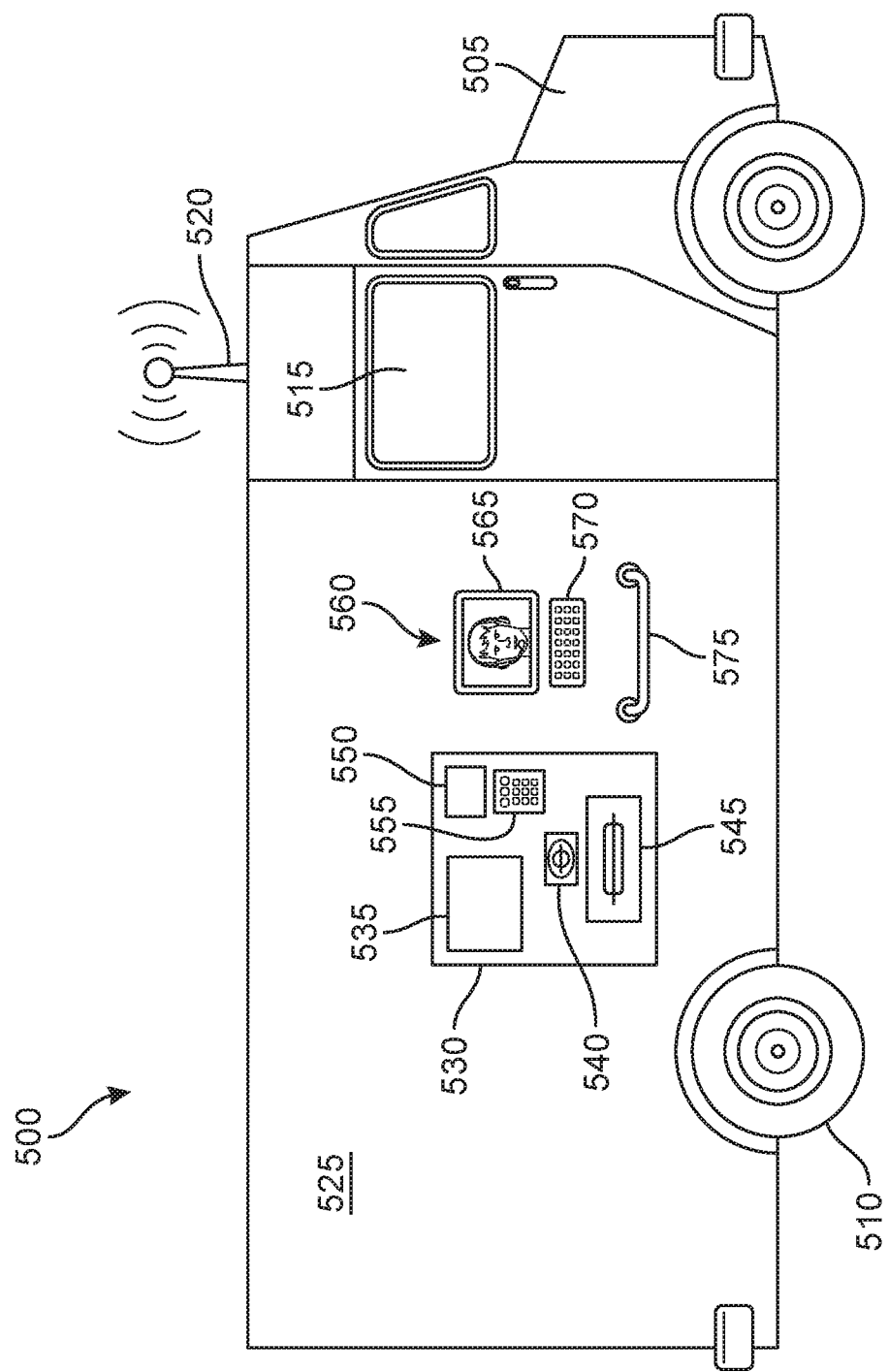
FIG. 5 is a schematic illustration of a vehicle configured to provide banking services.

FIG. 5 is a schematic illustration of a vehicle configured to provide banking services. Banking services vehicle 500 may include basic components of a vehicle, such as a power source 505, wheels 510, etc.

In some embodiments, power source 505 may include a combustion engine, configured to run on gasoline, diesel, ethanol, or other fuel. In other embodiments, power source 505 may include an electric motor, powered via a battery. In other embodiments, power source 505 may include a hybrid system, for example including both a combustion engine and an electric motor.

As shown in FIG. 5, vehicle 500 may include a cab 515 configured to seat one or more persons. In some cases, vehicle 500 may be conventionally driven with a driver. In other cases, vehicle 500 may be autonomous. In other cases, vehicle 500 may be operable in either a manual mode or an autonomous mode. In any of these configurations, cab 515 may be provided to hold one or more passengers. In some cases, cab 515 may include a cockpit from which vehicle 500 may be manually driven.

As shown in FIG. 5, vehicle 500 may include equipment configured to provide one or more services to a user in the presence of vehicle 500. For example, behind cab 515, vehicle 500 may include a rear section 525 that houses equipment for providing user services. As shown in FIG. 5, vehicle 500 may include an automated teller machine (ATM)

530. ATM 530 may include various components for providing ATM services, including a display screen 535, an ATM card slot 540, a cash dispensing device 545, and a keypad 555. Those of ordinary skill in the art will recognize suitable features of such components.

In addition, in some embodiments, vehicle 500 may include at least one authentication device 550 for authenticating a user as the user under whose name the service was requested. In some embodiments, authentication device 550 may include one or more biometric authentication devices. For example, authentication device 550 may include at least one of a fingerprint scanner, a handprint scanner, a facial recognition system, a voice recognition system, an eye scanner, and/or other biometric authentication devices.

As shown in FIG. 5, vehicle 500 may include a communication system 560 for communicating with an assistant service provider at a location remote from vehicle 500. Communication system 560 may be configured to provide an audio conference, a video conference, a text chat, or other type of communication with the assistant service provider. In some embodiments, communication system 560 may include a display screen 565 configured to display a video of the assistant service provider. Alternatively display screen 565 may display a still image of the assistant service provider, or information (e.g., name, title, contact info, etc.) about the assistant service provider. In some embodiments, communication system 560 may include an input device, such as a keyboard 570, as shown in FIG. 5. Other types of input devices may be used as well.

Communication system 560 may provide communication service with one or more of the following associates: an associate at a facility of the service provider nearest the location that the vehicle is providing service; an associate at a communication service center facility; an associate at a headquarters facility of the service provider; an associate that is predetermined based on prior assistance provided by the associate to the user.

At the place of business of service providers, users may have associates/agents with whom they prefer to conduct their affairs. For example, at a bank branch, a bank member may prefer to conduct their business with a particular bank teller, financial advisor, or other financial assistance associate. With communication system 560, a user may conduct their business with the same associate with whom they prefer to conduct their business. This may provide convenience to the user by having the service brought to them, while still being able to work with their preferred associate. In addition, this may benefit users who move, permanently or temporarily, to another geographic region. Despite no longer being physically near the bank branch with their preferred associate, they may still work with that associate via the remote communication system 560. This may benefit users, such as military personnel, who are deployed, reassigned, or otherwise relocated on a regular basis.

The systems and equipment discussed above may include computing hardware, such as a device processor, and a non-transitory computer readable medium including instructions executable by the device processor to provide the services discussed above. The systems on-board the vehicle may be discrete systems, or may be networked together.

In addition, vehicle 500 may include an antenna 520 and/or other equipment for sending and receiving communication signals. This equipment may be configured to send and receive signals for the dispatch and navigation of vehicle 500. Alternatively, or additionally, this equipment may be configured to send and receive signals for communicating information regarding the services provided, e.g., by the ATM and communication system 560.

In some embodiments, at least some of the fleet vehicles may include one or more accommodations for physically disabled persons. For example, as shown in FIG. 5, a handrail 575 may be provided at a predetermined height in order to assist physically disabled persons in using the equipment via walk-up access. Other accommodations for physical disabilities may include braille labels on the equipment, stairs, deployable ramps, etc. In some cases all of the vehicles in the fleet may be provided with such accommodations. In other cases, a portion of the vehicles may be provided with such accommodations, and such accommodations may be a selectable option when a user is summoning a vehicle for service.

Figure 6:
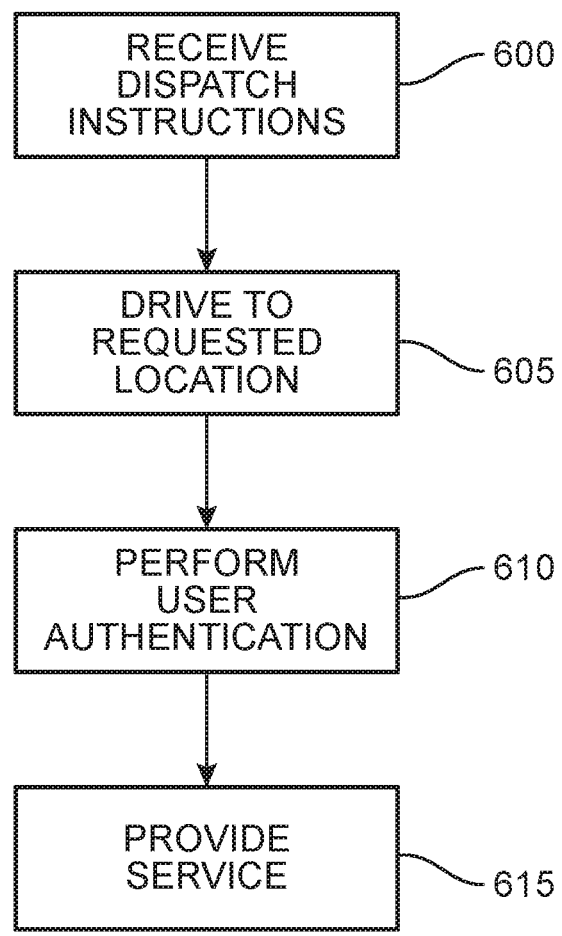
FIG. 6 is a flowchart illustrating a process of user authentication by a dispatched vehicle.

FIG. 6 is a flowchart illustrating a process of user authentication by a dispatched vehicle. As shown in FIG. 6, a computer readable medium of the vehicle equipment may include instructions for receiving dispatch instructions. (Step 600.) In addition, the computer readable medium may include instructions for executing the dispatch instructions by driving to a location designated by a user. (Step 605.) In some cases, the vehicle may be autonomous and may perform this step unpiloted.

As also shown in FIG. 6, the computer readable medium may include instructions for authenticating a user as the user under whose name the service was requested. (Step 610.) As discussed above, such authentication may be performed using one or more biometric authentication devices. Once the user has been authenticated, the system provides one or more services to the user at the designated location. (Step 615.) As discussed above, the one or more services provided to the user may include at least one of banking services, investment services, mortgage services, and document execution services.

Figure 7:
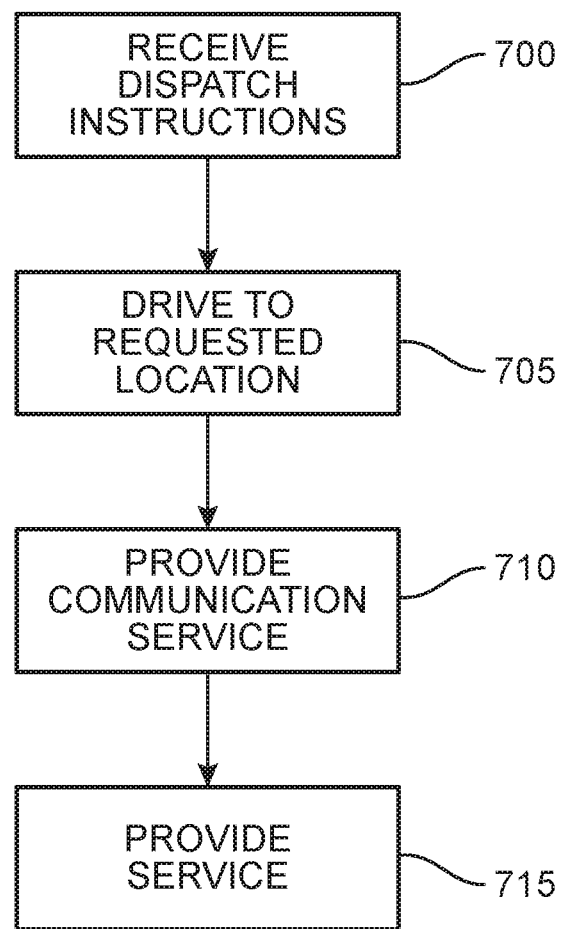
FIG. 7 is a flowchart illustrating a process of providing a communication service by a dispatched vehicle.

FIG. 7 is a flowchart illustrating a process of providing a communication service by a dispatched vehicle. A method of providing a service with an autonomous vehicle may include the vehicle receiving an instruction for vehicle dispatch in response to a user request for service. (Step 700.) The method may further include the vehicle driving to a location designated by the user. (Step 705.) In addition, the method may also include providing one or more services to the user at the designated location. (Step 715.) To facilitate the provision of services, in conjunction with providing the one or more services, the method may include providing a communication service between the user and an assistant service provider at a location remote from the vehicle via communication equipment provided on the vehicle. (Step 710.)

The features of vehicle 500 discussed above may be applicable to other fleet vehicles discussed below. For example, while not discussed again, each of the vehicles discussed above may include power sources, wheels, and communication equipment. Also, any of the vehicles discussed herein may be piloted, or autonomous, or may have the capability to operate in either mode. Further, some of the vehicles discussed below include some of the same components discussed above, such as an ATM, communication systems, handrails, etc. In the following embodiments, these components may have the same or similar features as discussed above with respect to other embodiments.

In some cases, it may be inconvenient for a person to travel to a business location simply to sign certain documents. For situations where original paper documents must be used for a transaction, significant convenience may be provided to a user by bringing the documents to them for signature. Further, transporting the signed documents to the intended recipient, be it the service provider or a third party. In some embodiments, one or more vehicles of the fleet may be configured to provide document execution services. For example, the vehicles may be configured to dispense documents for signature, and then accept the signed documents. Further, the vehicles may be configured to deliver the signed documents to a designated destination. In addition to the document dispensing, acceptance, and delivery, the vehicle may include a display and an input device. Also, the vehicles may include other equipment to facilitate execution of documents, such as a fold down shelf suitable for signing paper documents.

Figure 8:
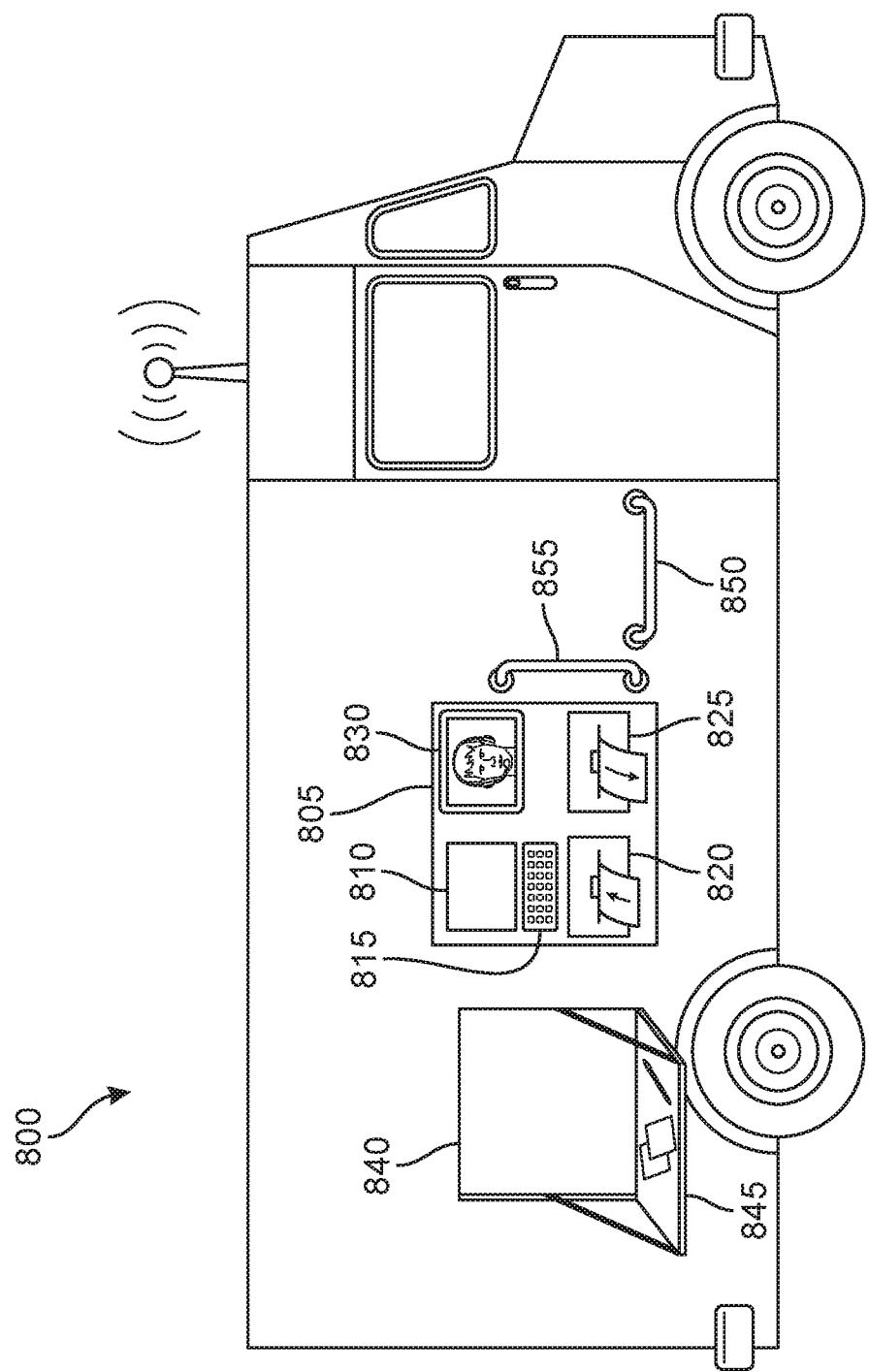
FIG. 8 is a schematic illustration of a vehicle configured to provide document execution services.

FIG. 8 is a schematic illustration of a vehicle configured to provide document execution services. As shown in FIG. 8, document execution services vehicle 800 may include a document kiosk 805. Document kiosk 805 may include a display screen 810 and an input device, such as a keyboard 815. In addition, document kiosk 805 may include a document dispensing device 825 configured to dispense documents to the user. In some embodiments, document dispensing device 825 may be configured to dispense unsigned documents for the user to sign. In addition, document kiosk 805 may include a document acceptance device 820 configured to accept documents inserted by the user. For example, the user may insert signed documents into document acceptance device 820.

In addition, vehicle 800 may include a communications system 830 configured to provide communication with an assistant service provider. Communications system 830 may include features discussed above with respect to other embodiments. In some embodiments communications system 830 may be provided as part of document kiosk 805. In other embodiments, communications system 830 may be provided as a separately located interface. In either configuration the components may be networked together or arranged as discrete system.

In addition, vehicle 800 may include signing equipment 840 to facilitate the signing of documents. For example, as shown in FIG. 8, vehicle 800 may include a drop-down shelf 845 which may be used for signing documents, filling out paperwork, and other administrative tasks.

Further, as also shown in FIG. 8, vehicle 800 may include accommodations for physically disabled persons. For example, vehicle 800 may include a handrail 850, which may be disposed at a predetermined height to assist disabled persons with walk-up access to the service equipment of vehicle 800. In addition, vehicle 800 may include a vertically oriented handle 855, as shown in FIG. 8. Handrail 850 and handle 855 are intended to generically illustrate structural accommodations for physically disabled persons. Those having skill in the art will readily recognize other such structural features which may benefit disabled persons.

Figure 9:
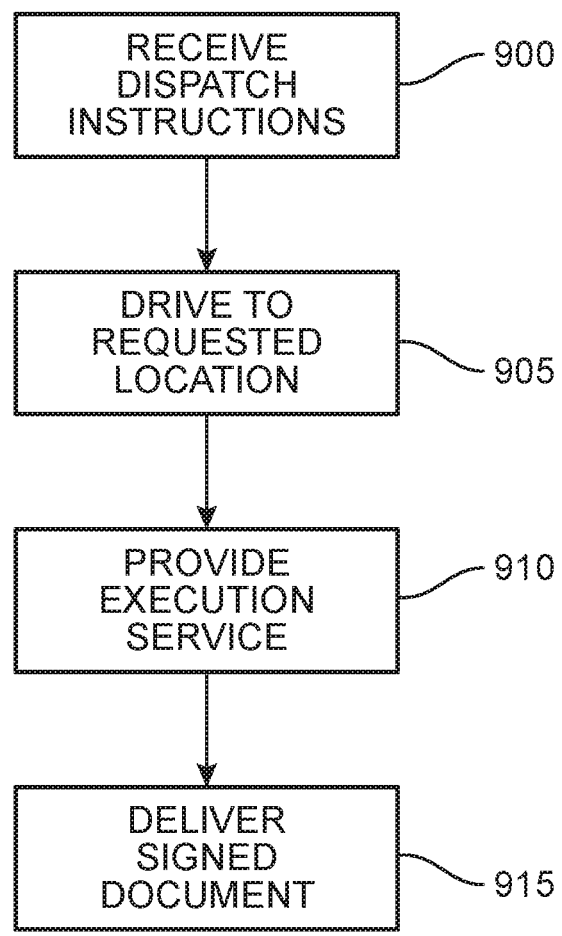
FIG. 9 is a flowchart illustrating a process of providing a document execution service by a dispatched vehicle.

FIG. 9 is a flowchart illustrating a process of providing a document execution service by a dispatched vehicle. As shown in FIG. 9, a computer readable medium of the vehicle equipment may include instructions for receiving dispatch instructions. (Step 900.) In addition, the computer readable medium may include instructions for executing the dispatch instructions by driving to a location designated by a user. (Step 905.)

In addition, the non-transitory computer readable medium may further include instructions for receiving a paper document and delivering the paper document to a second location. As shown in FIG. 9, the vehicle may provide the execution service. (Step 910.) Once the signed document has been accepted by the vehicle, the vehicle may deliver the signed document to a designated location. (Step 915.) The destination to which the signed document is to be delivered may be designated by the user using the input device on the document kiosk. Alternatively, the destination may be automatically recognized by text, marking, or barcode on the document accepted by the document kiosk.

In some embodiments, one or more vehicles of the fleet may include a mobile office space. That is, the vehicle may have an internal compartment with office equipment. The user may enter the compartment to conduct their business. The mobile office may include common features of an office, such as a desk, computer, and printer. In addition, the mobile office may also include a communication system configured to communicate with an assistant service provider. Further, in some embodiments, the mobile office may include seating for additional persons, such as an in-person assistant service provider. For example, in some embodiments, the service vehicle may transport an assistant service provider, such as a real estate agent, lawyer, financial advisor, etc. to the user. In the mobile office, the assistant service provider may assist the user in conducting their business.

Figure 10:
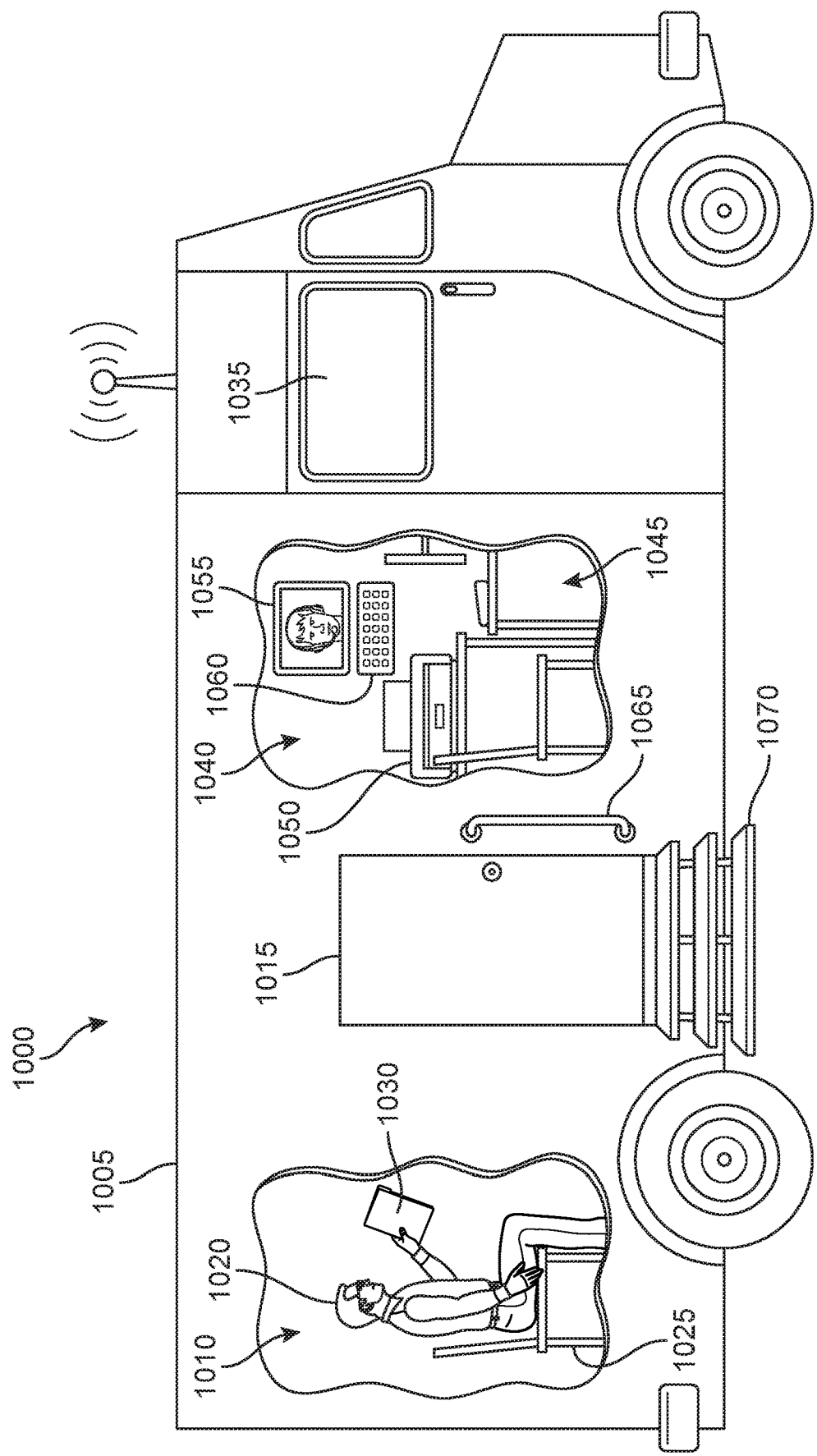
FIG. 10 is a schematic illustration of a vehicle configured to provide local services with an in-person assistant service provider.

FIG. 10 is a schematic illustration of a vehicle configured to provide local services with an in-person assistant service provider. As shown in FIG. 10, mobile office vehicle 1000 may include a rear section 1005 that includes an internal office compartment 1040.

As shown in FIG. 10, office compartment 1040 may include an assistant area 1010 in which assistant service provider 1020 may attend a conference or meeting with the user in office compartment 1040. The vehicle may transport assistant service provider 1020 to the designated location. In some cases, assistant service provider 1020 may bring documents 1030 associated with a particular transaction involved in the requested service. As further shown in FIG. 10, a chair 1025 may be provided for assistant service provider 1020.

In some embodiments, chair 1025 may be configured for assistant service provider 1020 to ride in as a passenger en route to the location. For example, chair 1025 may be fixed to the floor of office compartment 1040 and may include a passenger restraint (e.g., safety belt). In other embodiments, vehicle 1000 may be configured to transport an assistant service provider via a cab 1035, which may be configured with transport seating.

As also shown in FIG. 10, office compartment 1040 may include a desk and computer arrangement 1045, a printer 1050, and other office supplies and furnishings. In addition, office compartment 1040 may include a communication system including a display 1055 and an input device 1060. The communication system may be configured with the same or similar features to those discussed above with respect to other embodiments.

Vehicle 1000 may include a door 1015 to provide ingress and egress from office compartment 1040. To facilitate access, vehicle 1000 may include one or more stairs 1070. Stairs 1070 may be retractable for driving conditions. Stairs 1070 may be configured to provide predetermined accommodation to persons with physical disabilities. In addition, a handle 1065 may also be provided.

Figure 11:
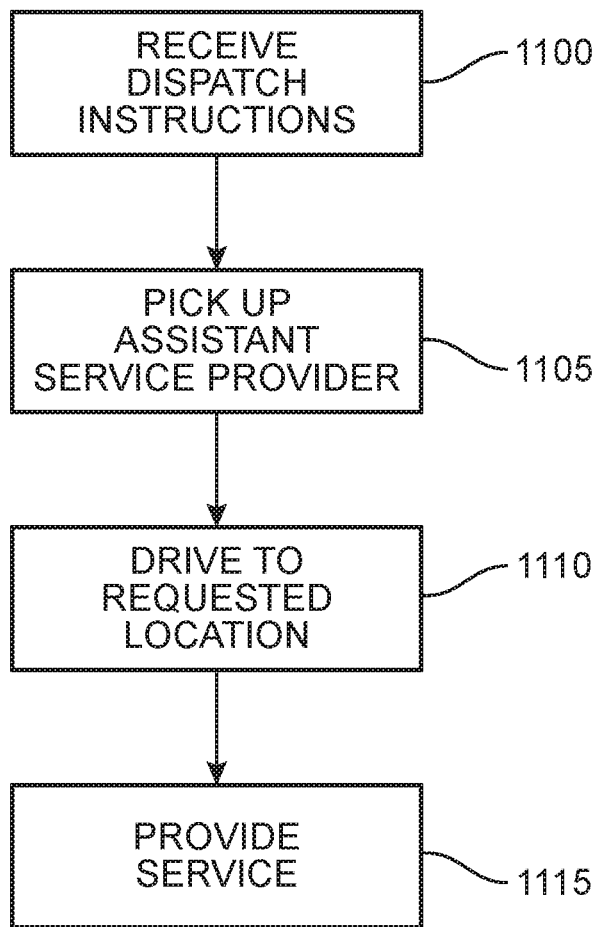
FIG. 11 is a flowchart illustrating a process of providing local services by a dispatched vehicle with an in-person assistant service provider.

FIG. 11 is a flowchart illustrating a process of providing local services by a dispatched vehicle with an in-person assistant service provider. As shown in FIG. 11, a computer readable medium of the vehicle equipment may include instructions for receiving dispatch instructions. (Step 1100.) In accordance with instructions, the vehicle may pick up an assistant service provider (step 1105) in order to transport them to the user in order to provide the requested services.

In addition, the computer readable medium may include instructions for executing the dispatch instructions by driving to a location designated by a user. (Step 1110.) Once the vehicle is on location, one or more services may be provided to the user at the designated location. (Step 1115.)

In some embodiments, one or more vehicles of the fleet may be equipped to provide more than one type of service. For example, in some embodiments, a vehicle may include both an ATM and a document kiosk. In other embodiments, a vehicle may include a mobile office and an ATM. In other embodiments, a vehicle may include a mobile office and a document kiosk.

Figure 12:
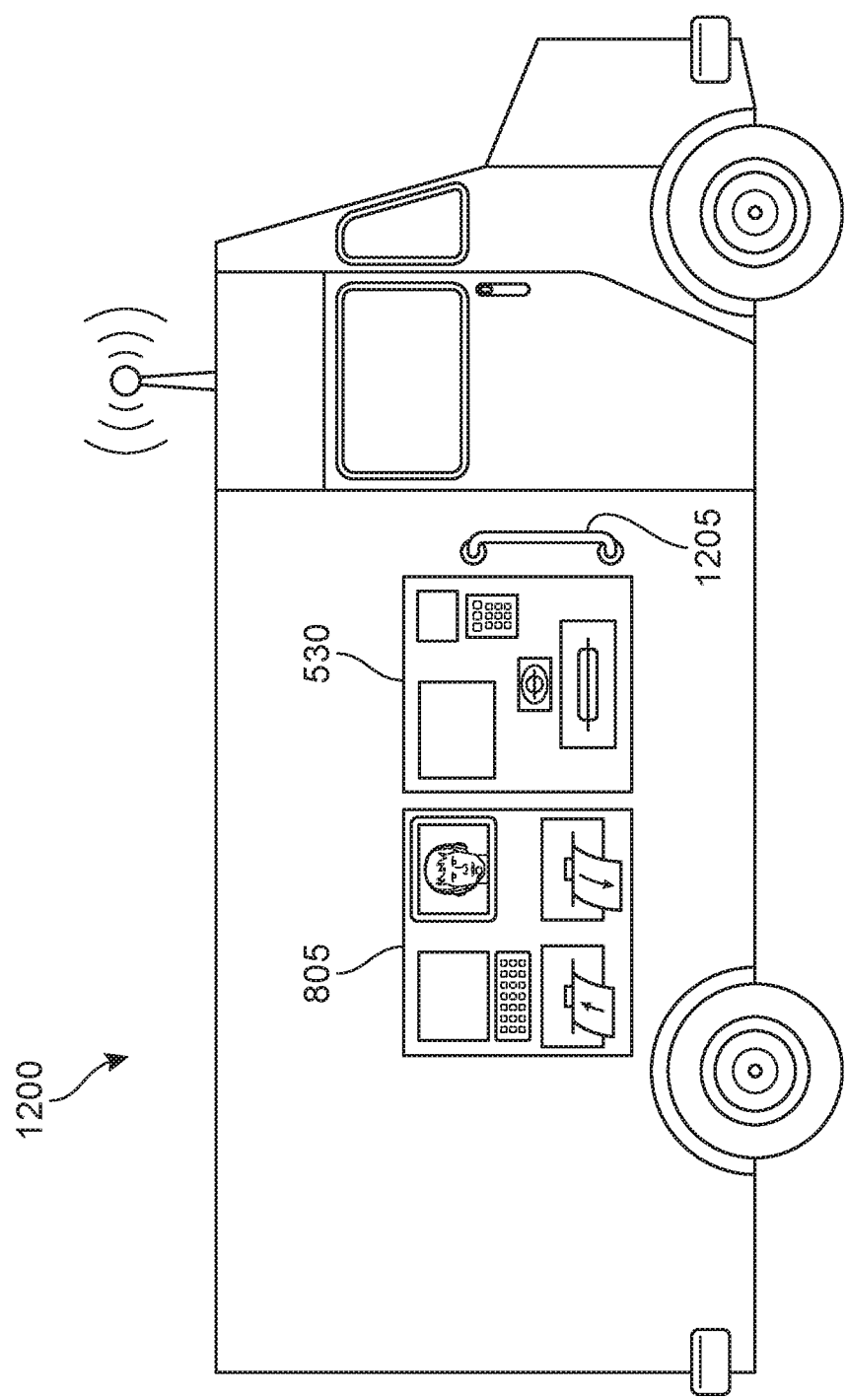
FIG. 12 is a schematic illustration of a vehicle configured to provide both banking services and document execution services.

FIG. 12 is a schematic illustration of a vehicle configured to provide both banking services and document execution services. As shown in FIG. 12, dual service vehicle 1200 may include a document kiosk 805 and an ATM 530. As also shown in FIG. 12, vehicle 1200 may include a handle 1205 or other accommodation for physically disabled persons. The configurations and features of these components may be the same or similar to corresponding features discussed above with respect to other embodiments.

In some embodiments, vehicles of the fleet may communicate with one another regarding information associated with the services they provide. For example, banking service vehicles can have fluctuating cash balances depending on whether more money is being withdrawn or deposited by users. In some embodiments, the fleet system may be configured to sync the cash states of multiple banking services vehicles. That is, the cash states of the vehicles may be considered collectively instead of individually.

Figure 13:
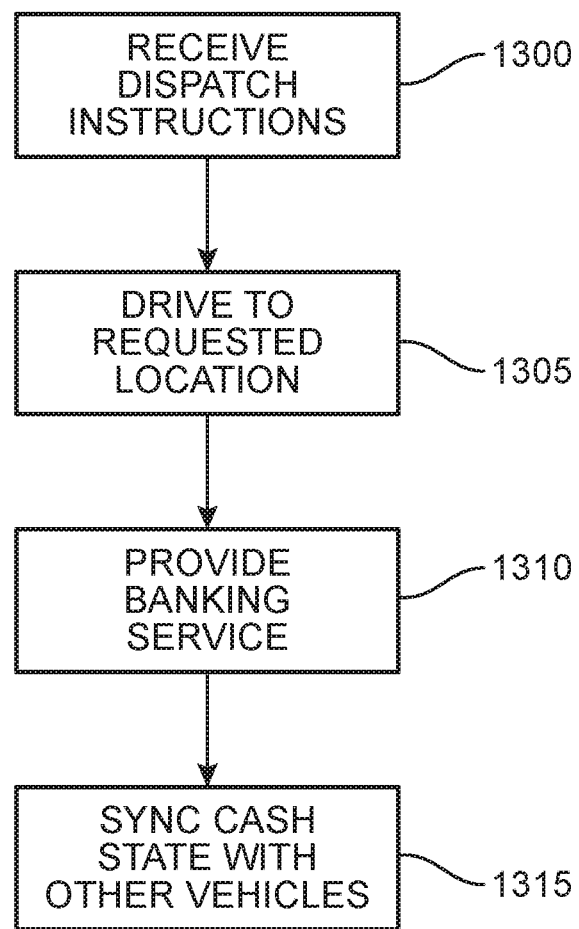
FIG. 13 is a flowchart illustrating a process of syncing a cash state of a banking services vehicle with other vehicles in a fleet.

FIG. 13 is a flowchart illustrating a process of syncing a cash state of a banking services vehicle with other vehicles in a fleet. As shown in FIG. 13, a computer readable medium of the vehicle equipment may include instructions for receiving dispatch instructions. (Step 1300.) In addition, the computer readable medium may include instructions for executing the dispatch instructions by driving to a location designated by a user. (Step 1305.) Once the vehicle is on location, one or more banking services may be provided to the user at the designated location. (Step 1310.) Following the transaction, the vehicle may sync its cash state with other vehicles of the fleet. (Step 1315.)

In some cases, efficiencies can be provided by investing predetermined portions of on-board cash balances once the balances meet a predetermined threshold. For example, once a cash balance is large enough, not all of the cash balance is expected to be withdrawn by users in a given dispatch period. Accordingly, any cash balance that exceeds the predetermined threshold may be electronically invested, and thus, made unavailable for withdrawal from the given vehicle.

Figure 14:
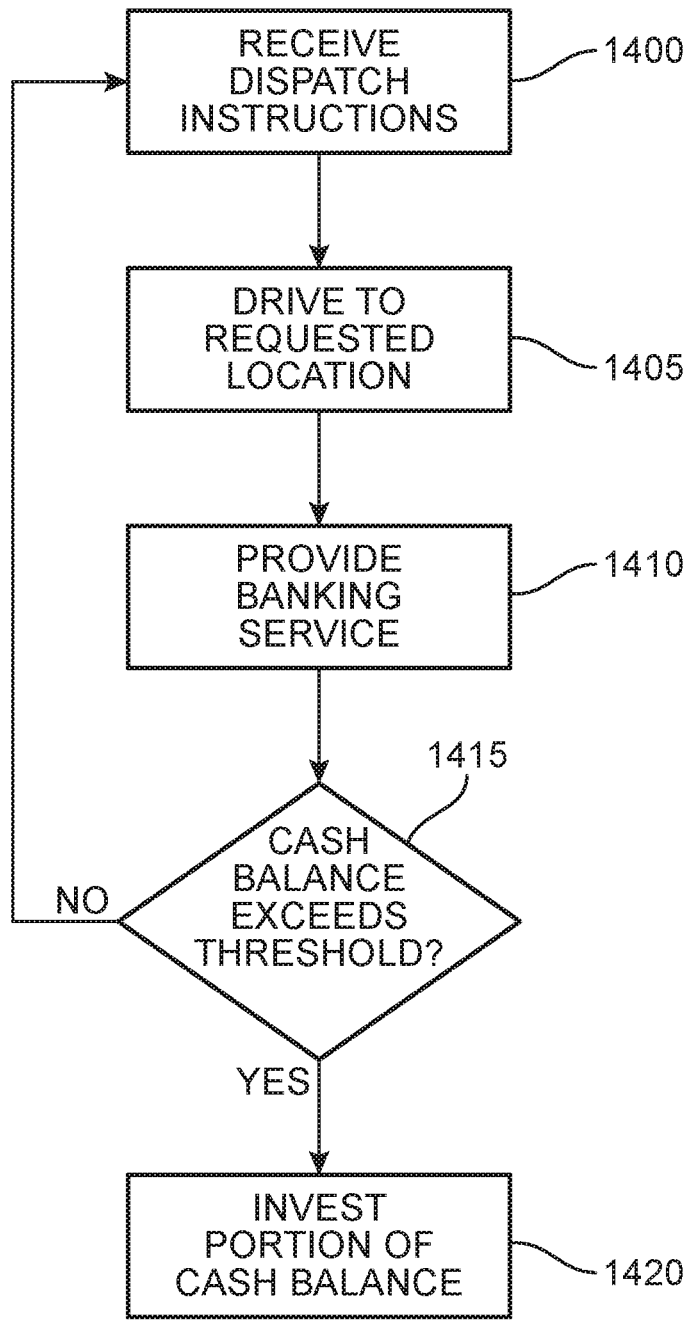
FIG. 14 is a flowchart illustrating a process of investing a portion of a cash balance of a vehicle upon the cash balance reaching a predetermined threshold.

FIG. 14 is a flowchart illustrating a process of investing a portion of a cash balance of a vehicle upon the cash balance reaching a predetermined threshold. As shown in FIG. 14, a computer readable medium of the vehicle equipment may include instructions for receiving dispatch instructions. (Step 1400.) In addition, the computer readable medium may include instructions for executing the dispatch instructions by driving to a location designated by a user. (Step 1405.) Once the vehicle is on location, one or more banking services may be provided to the user at the designated location. (Step 1410.) Next, an evaluation may be performed as to whether the cash balance exceeds a predetermined threshold. (Step 1415.) If not, the vehicle moves on to its next dispatch without doing anything with the cash balance. If the cash balance is determined to meet or exceed the predetermined threshold, then a portion of the cash balance may be invested. (Step 1420.) For example, the funds could be placed in a CD. The portion invested may be a percentage or a predetermined amount. Upon this investment, the funds may be made unavailable for withdrawal.

Figure 15:
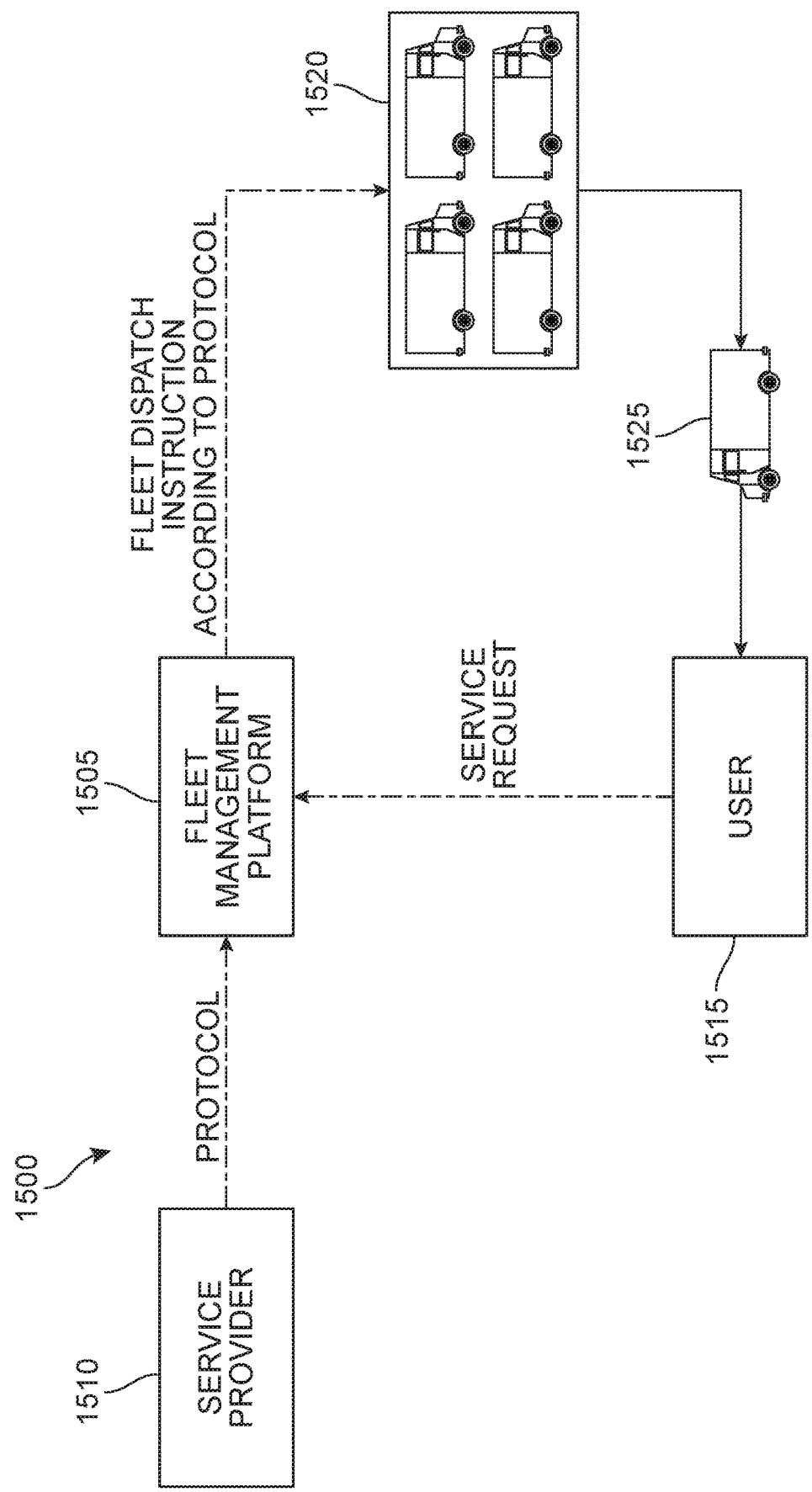
FIG. 15 is a schematic illustration of a fleet management platform and process of managing fleet dispatch based on a dispatch protocol designated by a service provider.

In some embodiments, a platform may be provided for others to manage a fleet of vehicles. FIG. 15 is a schematic illustration of a fleet management platform 1505 and process of managing fleet dispatch based on a dispatch protocol designated by a service provider 1510. That is, a service provider, such as a bank, law firm, real estate agent, etc., may designate a protocol by which they would like their fleet dispatched. As further shown in FIG. 15, a user 1515 may submit a service request to the fleet management platform 1505, which may send a fleet dispatch instruction to a fleet 1520 according to the designated protocol. In accordance with the dispatch instruction, a vehicle 1525 may be dispatched to the location designated by user 1515.

Figure 16:
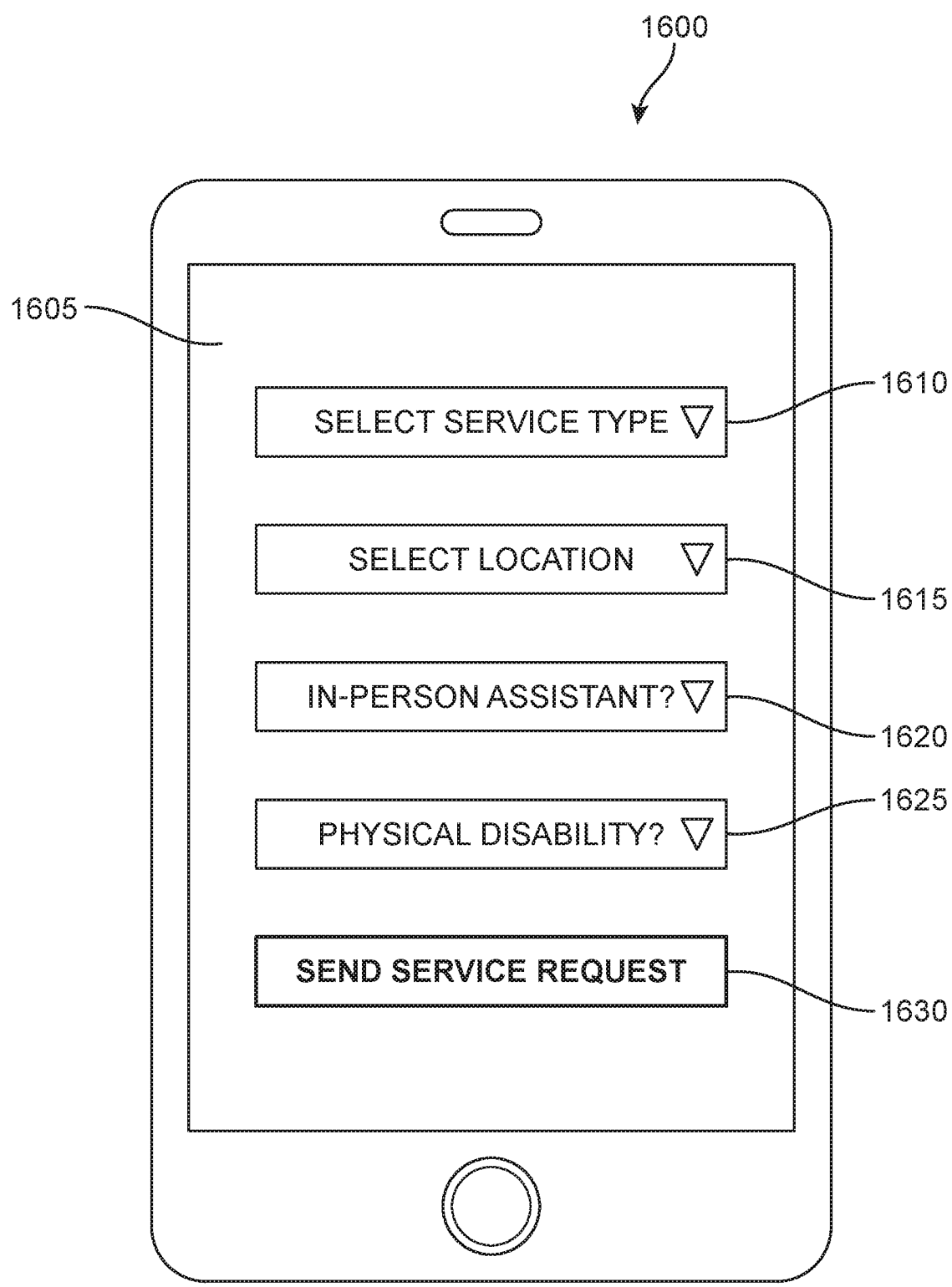
FIG. 16 is a schematic illustration of a personal electronic device displaying an application for summoning a service vehicle.

FIG. 16 is a schematic illustration of a personal electronic device displaying an application for summoning a service vehicle. As shown in FIG. 16, a vehicle summoning system 1600 may include, for example, a mobile phone or other electronic device. System 1600 may include a device processor and a non-transitory computer readable medium including instructions executable by the device processor. In particular, the computer readable medium may include instructions for submitting a user request for one or more predetermined services.

As shown in FIG. 16, system 1600 may also include a graphical user interface (GUI) 1605. GUI 1605 may have any suitable configuration. In some cases, GUI 1605 may include a touch screen. In other cases, GUI 1605 may include other input devices. As shown in FIG. 16, a services menu 1610 may be provided from which a user may select the type of service they wish to request. Such services may include banking services, investment services, document execution services, real estate services, mortgage services, etc.

In addition, submitting the user request may also include designating a location to which a vehicle is to be dispatched in order to provide the requested one or more predetermined services. A location field 1615 may enable a user to select or enter a location to which they would like services provided.

In addition, the user may select whether they would like an in-person assistant (menu 1620) and whether they require accommodations for a physical disability (menu 1625.)

Once all the details of the request have been selected or entered, the user may send the service request using the send button (1630).

The summoning system and the application through which it runs may be run on any type of operating system or interface suitable for accepting the type of information discussed above. There may be additional features, subfeatures, services, ancillary services, etc. that may be selected/requested by a user.

As an alternative or additional feature to GUI 1605, in some embodiments, the summoning system may include, or otherwise be accessed by, an intelligent voice assistant with which users may access the features of the vehicle fleet dispatch system. As used herein, the term "intelligent voice assistant" refers to an artificially intelligent assistant, also called a virtual assistant, that can speak to a user and understand the user's spoken words. Voice assistants, along with chat bots, may be more generally referred to as conversational interfaces (or CUIs), whose purposes are to mimic conversations with a real human. In some embodiments, the intelligent voice assistant may be configured with at least one processor, non-transitory computer readable medium (i.e., computer readable storage, or computer memory), one or more speakers and one or more microphones. Speakers may be used to produce audible information (that is, words and other sounds). Microphones may receive audible information (that is, words and other sounds). Optionally, an intelligent voice assistant could include a display. The intelligent voice assistant may also include components to facilitate communication with external systems (for example, hardware and software components to enable communication over a network). Optionally, an intelligent voice assistant could include other input devices such as buttons, a keyboard, a touch screen or other suitable input devices.

To ensure that the intelligent voice assistant is able to detect commands or other speech from users throughout an environment (such as a room in a house), microphones could comprise one or more far-field microphones. In some cases, the far-field microphones could also be directional. Using far-field microphones may allow the intelligent voice assistant to detect audible information that would not be detectable by other devices such as cell phones.

The intelligent voice assistant may include one or more software and/or hardware modules that facilitate various kinds of interactions with a user, including some of the interactions described above. For example, the intelligent voice assistant may include a voice module that controls general speech functionality, such as voice recognition and speech generation. Each of these modules may help enable the functionality described in further detail below.

An intelligent voice assistant may make use of any techniques in the field of machine learning or artificial intelligence for facilitating verbal communication with a user. In some embodiments, an intelligent voice assistant could include software making use of natural language processing to process incoming sounds (such as words), interpret the input, and produce audible responses (such as words). More specifically, an intelligent voice assistant could use speech recognition algorithms to process incoming speech, natural language understanding algorithms to determine the content of the speech, and natural language generation algorithms to produce speech that can be understood by a user.

In some embodiments, an intelligent voice assistant can include both a local computing device and a remote assistant services system. In some embodiments, the intelligent voice assistant includes a computing device, which may comprise a device with speakers, microphones and processors for interacting verbally with a user. Additionally, the intelligent voice assistant may include an assistant services system that is in communication with the computing device. While the computing device may be located at the premises of a user (for example, a user's home or office), the assistant services system may be located remotely, for example in the cloud.

In some embodiments, the intelligent voice assistant may be a stand-alone device with which users may interact. In other embodiments, the intelligent voice assistant may be implemented using a personal electronic device, such as a smart phone. In such embodiments, the hardware components of the personal electronic device, such as the on-board speaker(s), microphone(s), non-transitory computer readable medium, device processor, etc., may be utilized by a software program (e.g., an application or "app") that is stored on the personal electronic device to provide the functionality of an intelligent voice assistant.

The assistant services system may provide some of the intelligence and functionality of an intelligent assistant that is accessible over a network, such as the internet. For example, in some embodiments the computing device could receive audio information and send that audio information to the assistant services system (over a network) for processing. The results of processing the audio information may then be returned to the computing device to be spoken to a user. In other embodiments, this audio information could be processed locally by the intelligent voice assistant. In some other embodiments, some or all of the provisions of the assistant services system could be incorporated locally into the computing device. Likewise, in some embodiments, some of the provisions described above for the intelligent voice assistant may be incorporated into the assistant services system.

An intelligent voice assistant may be configured with one or more software applications or "apps." In some cases, these software applications may be acquired through an online application store and downloaded to the computing device. These applications may be stored locally using storage of the computing device and run using the at least one processor. These applications may use an application program interface to control various onboard components of the computing device, such as speakers, microphones, and the voice module.

The embodiments discussed herein may make use of methods and systems in artificial intelligence to improve efficiency and service by the fleet. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

I claim:
1. A vehicle dispatch system, comprising:
a device processor; and
a non-transitory computer readable medium including instructions executable by the device processor to perform the following steps:
receiving a user request for one or more services;
dispatching, from a first location to a second location designated by the user, a vehicle configured to provide one or more services to the user;
receiving notification of a paper document being collected by the vehicle via a document acceptance device incorporated into the vehicle;
receiving destination information regarding a third location to which the paper document is to be delivered;
receiving market data including vehicle status information and fleet status information; and dispatching the vehicle to deliver the paper document to the second location based on the destination information and the market data received by the system;

wherein receiving destination information regarding the second location to which the paper document is to be delivered includes receiving user input at an interface provided on an exterior of the vehicle.

2. The system of claim 1, wherein the vehicle is autonomous.

3. The system of claim 1, wherein the one or more services include at least one of banking services, investment services, mortgage services, and document execution services.

4. The system of claim 1, wherein the non-transitory computer readable medium further includes instructions to dispatch a fleet of vehicles in response to a plurality of user requests.

5. The system of claim 4, wherein the non-transitory computer readable medium further includes instructions for syncing a cash state with other vehicles in the fleet.

6. The system of claim 4, wherein the non-transitory computer readable medium further includes instructions for:
   recording data regarding operation of the vehicle; and
   using the data to determine a dispatch scheme of the fleet.

7. The system of claim 1, wherein the non-transitory computer readable medium further includes instructions for providing a communication service between a user of a vehicle and an assistant service provider at a location remote from the vehicle.

8. The system of claim 7, wherein the non-transitory computer readable medium further includes instructions for providing the communication service with one or more of the following associates:
   an associate at a facility of the service provider nearest the location that the vehicle is providing service;
   an associate at a communication service center facility;
   an associate at a headquarters facility of the service provider;
   an associate that is predetermined based on prior assistance provided by the associate to the user.

9. The system of claim 1, wherein the non-transitory computer readable medium further includes instructions for authenticating a user as the user under whose name the service was requested; and
   wherein the non-transitory computer readable medium further includes instructions for authenticating the user using one or more biometric signatures.

10. The system of claim 9, wherein the market data includes at least one of vehicle condition, fleet status, regional information, and national information.

11. The system of claim 1, wherein the non-transitory computer readable medium further includes instructions for providing banking services; and
   electronically investing a predetermined portion of a cash balance on the vehicle when the cash balance on the vehicle reaches a predetermined threshold.

12. A vehicle summoning system, comprising:
   a device processor; and
   a non-transitory computer readable medium including instructions executable by the device processor to perform the following steps:
      receiving one or more user requests for one or more predetermined services;
      submitting the user request to a dispatch center;
      wherein the user request includes a designation of a first location to which a vehicle is to be dispatched in order to provide the requested one or more predetermined services;
      the user request including a request for a document collection service whereby a document acceptance device incorporated into the vehicle is configured to receive a paper document; and
      receiving destination information regarding a second location to which the paper document is to be delivered;
      wherein the destination information regarding the second location to which the paper document is to be delivered is received via user input at an interface provided on an exterior of the vehicle.

13. The system of claim 12, wherein the one or more services include at least one of banking services, investment services, mortgage services, and document execution services.

14. The system of claim 12, wherein submitting the user request includes designating a request for a vehicle with accommodations for a physical disability of the user.

15. An autonomous vehicle fleet management platform, comprising:
   a device processor; and
   a non-transitory computer readable medium including instructions executable by the device processor to perform the following steps:
      receiving a vehicle fleet dispatch protocol from a service provider;
      receiving one or more user requests for service from one or more users;
      dispatching vehicles of an autonomous vehicle fleet in response to the one or more user requests and according to the vehicle fleet dispatch protocol, including dispatching at least one vehicle to a first location;
      receiving notification of a paper document being collected at the first location by the vehicle via a document acceptance device incorporated into the vehicle;
      receiving destination information regarding a second location to which the paper document is to be delivered;
      wherein the destination information regarding the second location to which the paper document is to be delivered is received via user input at an interface provided on an exterior of the vehicle; and
      dispatching the vehicle to deliver the paper document to the second location based on the destination information and the market data received by the system.

16. The platform of claim 15, wherein the autonomous vehicle fleet includes different vehicles configured to provide different services; and
   wherein the fleet dispatch protocol dictates dispatch of different vehicles depending upon the services requested by the one or more users.

17. The platform of claim 15, wherein the non-transitory computer readable medium further includes instructions for receiving a protocol for providing a communication service between users of vehicles of a vehicle fleet and an assistant service provider at a location remote from the vehicles of the vehicle fleet via communication equipment provided on the vehicles of the vehicle fleet.

* * * * *